(12) United States Patent
Chen et al.

(10) Patent No.: US 12,279,299 B2
(45) Date of Patent: Apr. 15, 2025

(54) RESOURCE CONFIGURATION METHOD, BASE STATION AND TERMINAL

(71) Applicant: DATANG MOBILE COMMUNICATIONS EQUIPMENT CO., LTD., Beijing (CN)

(72) Inventors: Li Chen, Beijing (CN); Jinhua Miao, Beijing (CN); Yali Zhao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 643 days.

(21) Appl. No.: 17/280,813

(22) PCT Filed: Sep. 20, 2019

(86) PCT No.: PCT/CN2019/106927
§ 371 (c)(1),
(2) Date: Mar. 26, 2021

(87) PCT Pub. No.: WO2020/063469
PCT Pub. Date: Apr. 2, 2020

(65) Prior Publication Data
US 2022/0015116 A1     Jan. 13, 2022

(30) Foreign Application Priority Data
Sep. 28, 2018 (CN) .......................... 201811142459.X

(51) Int. Cl.
*H04W 72/14*     (2009.01)
*H04W 72/23*     (2023.01)
*H04W 72/566*     (2023.01)

(52) U.S. Cl.
CPC .......... *H04W 72/569* (2023.01); *H04W 72/23* (2023.01)

(58) Field of Classification Search
CPC . H04W 72/23; H04W 72/5699; H04W 72/56; H04L 5/0053
See application file for complete search history.

(56) References Cited

U.S. PATENT DOCUMENTS

2016/0139948 A1    5/2016    Beveridge et al.
2016/0218849 A1    7/2016    Bertrand et al.
(Continued)

FOREIGN PATENT DOCUMENTS

CN    103619037 A    3/2014
CN    106211332 A    12/2016
(Continued)

OTHER PUBLICATIONS

MediaTek Inc., "On UL Multiplexing for URLLC", R1-1806813, 3GPP TSG RAN WG1 Meeting #93, Busan, South Korea, May 21-25, 2018, all pages.
(Continued)

*Primary Examiner* — Syed Ali
(74) *Attorney, Agent, or Firm* — Ladas & Parry, LLP

(57) ABSTRACT

The present disclosure provides a resource configuration method, a base station and a terminal. The resource configuration method applied for the base station side includes transmitting configuration indication information to a terminal. The configuration indication information is configured to indicate priority level information about dynamically-scheduled resources and preconfigured grant resources when data transmission is performed by the terminal.

9 Claims, 3 Drawing Sheets

(56) References Cited

U.S. PATENT DOCUMENTS

| | | | |
|---|---|---|---|
| 2018/0160418 | A1 | 6/2018 | Luo et al. |
| 2018/0176937 | A1* | 6/2018 | Chen ................. H04W 72/21 |
| 2019/0207737 | A1* | 7/2019 | Babaei ............... H04L 27/2607 |
| 2019/0215717 | A1* | 7/2019 | Lee .................... H04W 72/21 |
| 2019/0223164 | A1* | 7/2019 | He ..................... H04L 25/0204 |
| 2019/0230654 | A1 | 7/2019 | Luo et al. |
| 2019/0246420 | A1* | 8/2019 | Park ................... H04W 72/23 |
| 2019/0261281 | A1* | 8/2019 | Jung .................. H04W 72/0473 |
| 2021/0258929 | A1* | 8/2021 | Sakhnini ........... H04W 52/0261 |
| 2021/0368544 | A1* | 11/2021 | Liu .................... H04W 74/0808 |
| 2021/0377989 | A1* | 12/2021 | Chae .................. H04L 1/1861 |

FOREIGN PATENT DOCUMENTS

| | | |
|---|---|---|
| CN | 107371260 A | 11/2017 |
| CN | 108322939 A | 7/2018 |
| WO | 2015161455 A1 | 10/2015 |
| WO | 2017/172937 A1 | 10/2017 |

OTHER PUBLICATIONS

Vivo, "Collision Between Grant-based and Grant-free Resources on the Same UL Carrier", R2-1708488, 3GPP TSG-RAN WG2 Meeting#99, Berlin, Germany, Aug. 21-25, 2017, all pages.

ZTE, "Considerations on configured grant for NR-U", R2-1811279, 3GPP TSG RAN WG2 NR #103 Meeting, Gothenburg, Sweden, Aug. 20-24, 2018, all pages.

Extended European Search Report from EP app. No. 19866453.4, dated Nov. 10, 2021, all pages.

First Office Action and Search Report from CN app. No. 201811142459.X, dated Oct. 13, 2020, with English translation from Global Dossier, all pages.

Second Office Action and Search Report from CN app. No. 201811142459.X, dated Apr. 8, 2021, with English translation from Global Dossier, all pages.

International Search Report from PCT/CN2019/106927, dated Dec. 18, 2019, with English translation from WIPO, all pages.

Written Opinion of the International Searching Authority from PCT/CN2019/106927, dated Dec. 18, 2019, with English translation from WIPO, all pages.

International Preliminary Report on Patentability from PCT/CN2019/106927, dated Mar. 23, 2021, with English translation from WIPO, all pages.

"Overview of UL data transmission schemes for URLLC", R1-1701025, 3GPP TSG-RAN WG1#NR, Spokane, WA, USA, Jan. 16-20, 2017, all pages.

"Discussion on handling collision issues of UL URLLC and eMBB", R1-1806369, 3GPP TSG RAN WG1 Meeting #93, Busan, Korea, May 21-25, 2018, all pages.

"Collision between grant-based and grant-fee resources on the same UL carrier", R2-1710960, 3GPP TSG-RAN WG2 Meeting #99bis, Prague, Czech Republic, Oct. 9-13, 2017, all pages.

"Summary of [99bis#41][NR UP/MAC] Open issues on SPS and GF-Huawei", R2-1713173, 3GPP TSG RAN WG2 Meeting 100, Reno, United States, Nov. 27-Dec. 1, 2017, all pages.

\* cited by examiner transmitting configuration indication information to a terminal, the configuration indication information being configured to indicate priority level information about dynamically-scheduled resources and preconfigured grant resources when data transmission is performed by the terminal — 101
Fig. 1a
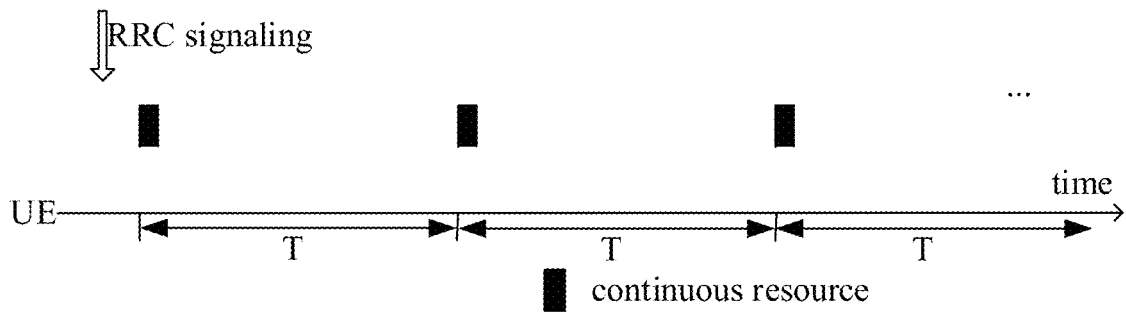
Fig. 1b
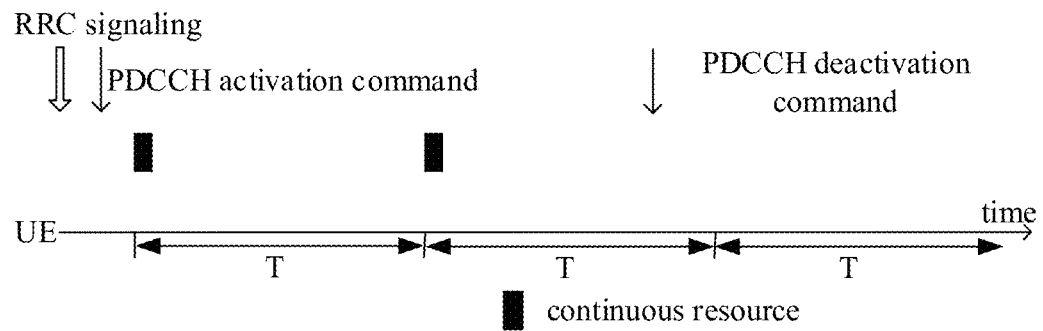
Fig. 1c

RESOURCE CONFIGURATION METHOD, BASE STATION AND TERMINAL

CROSS-REFERENCE TO RELATED APPLICATIONS

This application is the U.S. national phase of PCT Application No. PCT/CN2019/106927 filed on Sep. 20, 2019, which claims a priority of the Chinese patent application No. 201811142459.X filed on Sep. 28, 2018, the disclosures of which are incorporated herein by reference in their entireties.

TECHNICAL FIELD

The present disclosure relates to the field of wireless communication technology, in particular to a resource configuration method, a base station and a terminal.

BACKGROUND

Preconfigured resource refers to a resource which is allocated by a network side for a terminal in advance and which does not need to be dynamically scheduled. There are two types of allocation of an uplink configuration resource in a New Radio (NR) system, i.e., a configured grant type 1 and a configured grant type 2. In the configured grant type 1, a base station allocates a specific uplink resource for the terminal through Radio Resource Control (RRC) signaling, including a resource periodicity, a corresponding Configured Scheduling Radio Network Temporary Identifier (CS-RNTI), a time-frequency resource position and a specific transmission format (e.g., Modulation and Coding Scheme (MC S)), and the terminal may acquire a periodic uplink transmission resource in accordance with configuration information and immediately transmit uplink data in accordance with the allocated periodic uplink transmission resource. During the configuration of a logic channel, whether the logic channel is capable of using the resource of the configured grant type 1 may also be configured. In the configured grant type 2, the base station allocates the periodicity of the periodic uplink transmission resource and the CS-RNTI for the terminal through RRC signaling. Subsequently, the base station may activate or deactivate the preconfigured resource of the configured grant type 2 through a Physical Downlink Control Channel (PDCCH) command, and the base station may indicate a specific transmission resource, including a time-frequency resource and a transmission format, in the PDCCH command for activating the configured grant type 2.

The dynamic scheduling refers to single resource allocation performed by the base station for the terminal using the PDCCH command. In the uplink dynamic scheduling, the terminal parses the time-frequency resource position and the transmission format indicated in the PDCCH command, and transmits the uplink data in a specified transmission format at the time-frequency resource position.

In Long Term Evolution (LTE) and NR Rel-15, the dynamic scheduling always takes precedence over the allocation of the preconfigured grant resource. It is generally recognized that, there must be a reason for the base station to perform the dynamic scheduling for the terminal when there is a preconfigured resource for a User Equipment (UE), and the dynamic scheduling must be controlled by the base station.

In a subsequent NR version, considering the requirements on higher service latency and reliability, when the dynamic scheduling always takes precedence over the preconfigured grant, in one case, a low-latency and high-reliable service may be mapped to a dynamically-scheduled resource, but a dynamically-scheduled Physical Uplink Shared Channel (PUSCH) has a too large length and a processing time and a feedback time are too long, so it is impossible to meet the requirements of the low-latency and high-reliable service on the latency and/or reliability. In another case, the low-latency and high-reliable service cannot be mapped to the dynamically-scheduled resource in accordance with a configuration mapped to the logic channel, and at this time, the preconfigured grant resource is unavailable, so a data packet for the low-latency and high-reliable service cannot be transmitted. In this regard, it is impossible to meet the requirements of the low-latency and high-reliable service.

SUMMARY

An object of the present disclosure is provide a resource configuration method, a base station and a terminal, so as to solve the problem of a conventional resource allocation technology where it is impossible to meet the requirements of the low-latency and high-reliable service.

In one aspect, the present disclosure provides in some embodiments a resource configuration method applied for a base station, including transmitting configuration indication information to a terminal. The configuration indication information is configured to indicate priority level information about dynamically-scheduled resources and preconfigured grant resources when data transmission is performed by the terminal.

In a possible embodiment of the present disclosure, the configuration indication information is transmitted to the terminal through RRC signaling or physical layer signaling.

In a possible embodiment of the present disclosure, the configuration indication information is configured to indicate that a priority level of a target preconfigured grant resource is higher than a priority level of the dynamically-scheduled resource when the data transmission is performed by the terminal.

In a possible embodiment of the present disclosure, the configuration indication information is transmitted to the terminal through RRC signaling for a configured grant resource, and the configuration indication information is configured to indicate that a priority level of the preconfigured grant resource configured by the configured grant resource is higher than a priority level of the dynamically-scheduled resource.

In a possible embodiment of the present disclosure, when a plurality of preconfigured grant resources has been configured by the configured grant resource, the configuration indication information is configured to indicate that a priority level of each of a part of the preconfigured grant resources is higher than the priority level of the dynamically-scheduled resource.

In a possible embodiment of the present disclosure, the configuration indication information is further configured to indicate priority levels of the plurality of preconfigured grant resources through indicating a correspondence between configured grant resource indices and priority levels, and each preconfigured grant resource index corresponds to a group of preconfigured grant resources.

In a possible embodiment of the present disclosure, the configuration indication information is included in RRC signaling for configuring a logic channel, and configured to indicate that a priority level of the transmission of logic channel data through the preconfigured grant resource or one or more specified preconfigured grant resources is higher than a priority level of the transmission of the logic channel data through the dynamically-scheduled resource.

In a possible embodiment of the present disclosure, when the configuration indication information indicates that the priority level of the data transmission through a plurality of preconfigured grant resources is higher than the priority level of the data transmission through the dynamically-scheduled resource, the configuration indication information is further configured to indicate priority levels of the transmission of logic channel data through the plurality of preconfigured grant resources.

In a possible embodiment of the present disclosure, the configuration indication information is configured to indicate the terminal to select by itself priority levels of the dynamically-scheduled resource and the preconfigured grant resource when the data transmission is performed.

In a possible embodiment of the present disclosure, the configuration indication information is configured to indicate the terminal to select by itself priority levels of the dynamically-scheduled resource and the target preconfigured grant resource for the transmission of target logic channel data when the data transmission is performed by the terminal.

In a possible embodiment of the present disclosure, the configuration indication information is transmitted to the terminal through RRC signaling.

In a possible embodiment of the present disclosure, the configuration indication information is transmitted to the terminal through a PDCCH command for activating preconfigured grant, and the configuration indication information is configured to indicate that a priority level of a preconfigured grant resource activated through the PDCCH command is higher than the priority level of the dynamically-scheduled resource.

In a possible embodiment of the present disclosure, the configuration indication information is indicated through a specific field in Downlink Control Information (DCI) carried in the PDCCH command, or indicated through scrambling the PDCCH command with an additionally-configured CS-RNTI.

In a possible embodiment of the present disclosure, the configuration indication information is transmitted to the terminal through a dynamic resource scheduling command, and configured to indicate that the priority level of the dynamically-scheduled resource allocated through the dynamic resource scheduling command is higher than or lower than the priority level of the preconfigured grant resource.

In a possible embodiment of the present disclosure, the configuration indication information is indicated through a specific field in DCI carried in the PDCCH command, or indicated through scrambling the PDCCH command with an additionally-configured CS-RNTI.

In another aspect, the present disclosure provides in some embodiments a resource configuration method applied for a terminal, including: acquiring configuration indication information from a base station, the configuration indication information being configured to indicate priority level information about dynamically-scheduled resources and preconfigured grant resources when data transmission is performed by the terminal; and when the dynamically-scheduled resources at least partially overlap the preconfigured grant resources, selecting a resource for the data transmission in accordance with the priority level information.

In a possible embodiment of the present disclosure, the configuration indication information is transmitted through RRC signaling or physical layer signaling.

In a possible embodiment of the present disclosure, the configuration indication information is configured to indicate that a priority level of a target preconfigured grant resource is higher than a priority level of the dynamically-scheduled resource when the data transmission is performed by the terminal.

In a possible embodiment of the present disclosure, the configuration indication information is transmitted through RRC signaling for a configured grant resource, and the configuration indication information is configured to indicate that a priority level of the preconfigured grant resource configured by the configured grant resource is higher than a priority level of the dynamically-scheduled resource.

In a possible embodiment of the present disclosure, when a plurality of preconfigured grant resources has been configured by the configured grant resource, the configuration indication information is configured to indicate that a priority level of each of a part of the preconfigured grant resources is higher than the priority level of the dynamically-scheduled resource.

In a possible embodiment of the present disclosure, the configuration indication information is further configured to indicate priority levels of the plurality of preconfigured grant resources through indicating a correspondence between configured grant resource indices and priority levels, and each preconfigured grant resource index corresponds to a group of preconfigured grant resources.

In a possible embodiment of the present disclosure, the configuration indication information is included in RRC signaling for configuring a logic channel, and configured to indicate that a priority level of the transmission of logic channel data through the preconfigured grant resource or one or more specified preconfigured grant resources is higher than a priority level of the transmission of the logic channel data through the dynamically-scheduled resource.

In a possible embodiment of the present disclosure, when the configuration indication information indicates that the priority level of the data transmission through a plurality of preconfigured grant resources is higher than the priority level of the data transmission through the dynamically-scheduled resource, the configuration indication information is further configured to indicate priority levels of the transmission of the logic channel data through the plurality of preconfigured grant resources.

In a possible embodiment of the present disclosure, the configuration indication information is configured to indicate the terminal to select by itself priority levels of the dynamically-scheduled resource and the preconfigured grant resource when the data transmission is performed.

In a possible embodiment of the present disclosure, the configuration indication information is configured to indicate the terminal to select by itself priority levels of the dynamically-scheduled resource and the target preconfigured grant resource for the transmission of target logic channel data when the data transmission is performed by the terminal.

In a possible embodiment of the present disclosure, the configuration indication information is transmitted to the terminal through a PDCCH command for activating preconfigured grant, and the configuration indication information is configured to indicate that a priority level of a preconfigured grant resource activated through the PDCCH command is higher than the priority level of the dynamically-scheduled resource.

In a possible embodiment of the present disclosure, the configuration indication information is transmitted to the terminal through a dynamic resource scheduling command, and configured to indicate that the priority level of the dynamically-scheduled resource allocated through the dynamic resource scheduling command is higher than or lower than the priority level of the preconfigured grant resource.

In a possible embodiment of the present disclosure, the selecting the resource for the data transmission in accordance with the priority level information when the dynamically-scheduled resources at least partially overlap the preconfigured grant resources includes, when the target preconfigured grant resources at least partially overlap the dynamically-scheduled resources, performing the data transmission through the target preconfigured grant resource.

In a possible embodiment of the present disclosure, the selecting the resource for the data transmission in accordance with the priority level information when the dynamically-scheduled resources at least partially overlap the preconfigured grant resources includes: when the target preconfigured grant resources at least partially overlap the dynamically-scheduled resources, detecting a priority level of to-be-transmitted logic channel data in a cache; when the to-be-transmitted logic channel data with a highest priority level is capable of being transmitted through the target preconfigured grant resource, transmitting the to-be-transmitted logic channel data through the target preconfigured grant resource; and when the to-be-transmitted logic channel data with the highest priority level is incapable of being transmitted through the target preconfigured grant resource, transmitting the to-be-transmitted logic channel data through the dynamically-scheduled resource.

In a possible embodiment of the present disclosure, the selecting the resource for the data transmission in accordance with the priority level information when the dynamically-scheduled resources at least partially overlap the preconfigured grant resources includes: when the target preconfigured grant resources at least partially overlap the dynamically-scheduled resources, detecting a mapping condition of to-be-transmitted data in a cache and target preconfigured grant resources; when the to-be-transmitted data includes data capable of being transmitted through the target preconfigured grant resource, transmitting the to-be-transmitted data through the target preconfigured grant resource; and when the to-be-transmitted data does not include any data capable of being transmitted through the target preconfigured grant resource, transmitting the to-be-transmitted data through the dynamically-scheduled resource.

In a possible embodiment of the present disclosure, the selecting the resource for the data transmission in accordance with the priority level information when the dynamically-scheduled resources at least partially overlap the preconfigured grant resources includes: when the target preconfigured grant resources at least partially overlap the dynamically-scheduled resources, detecting whether a logic channel with a highest priority level in logic channels to which the to-be-transmitted data belongs in a cache is capable of using the target preconfigured grant resource; when the logic channel with the highest priority level is capable of using the target preconfigured grant resource, transmitting the to-be-transmitted data through the target preconfigured grant resource; and when the logic channel with the highest priority level is incapable of using the target preconfigured grant resource, transmitting the to-be-transmitted data through the dynamically-scheduled resource.

In a possible embodiment of the present disclosure, the selecting the resource for the data transmission in accordance with the priority level information when the dynamically-scheduled resources at least partially overlap the preconfigured grant resources includes: when the target preconfigured grant resources at least partially overlap the dynamically-scheduled resources, detecting whether logic channels to which the to-be-transmitted data belongs in a cache include a logic channel capable of using the target preconfigured grant resource; when the logic channels include the logic channel capable of using the target preconfigured grant resource, transmitting the to-be-transmitted data through the target preconfigured grant resource; and when the logic channels do not include the logic channel capable of using the target preconfigured grant resource, transmitting the to-be-transmitted data through the dynamically-scheduled resource.

In a possible embodiment of the present disclosure, the selecting the resource for the data transmission in accordance with the priority level information when the dynamically-scheduled resources at least partially overlap the preconfigured grant resources includes, when the target preconfigured grant resources at least partially overlap the dynamically-scheduled resources, selecting, by the terminal, the target preconfigured grant resource or the dynamically-scheduled resource as a prior resource for the to-be-transmitted data in accordance with a correspondence among positions of the target preconfigured grant resources, positions of the dynamically-scheduled resources, and logic channels in the cache.

In a possible embodiment of the present disclosure, when the configuration indication information indicates that the priority level of the dynamically-scheduled resource allocated through the dynamic resource scheduling command is higher than the priority level of the preconfigured grant resource and the dynamically-scheduled resources at least partially overlap the preconfigured grant resources, the selecting the resource for the data transmission in accordance with the priority level information includes, when the target preconfigured grant resources at least partially overlap the dynamically-scheduled resources, transmitting the to-be-transmitted data through the dynamically-scheduled resource.

In a possible embodiment of the present disclosure, when the configuration indication information indicates that the priority level of the dynamically-scheduled resource allocated through the dynamic resource scheduling command is lower than the priority level of the preconfigured grant resource and the dynamically-scheduled resources at least partially overlap the preconfigured grant resources, the selecting the resource for the data transmission in accordance with the priority level information includes: when the target preconfigured grant resources at least partially overlap the dynamically-scheduled resources, detecting a priority level of to-be-transmitted logic channel data in a cache; when the to-be-transmitted logic channel data with a highest priority level is capable of being transmitted through the target preconfigured grant resource, transmitting the to-be-transmitted logic channel data through the target preconfigured grant resource; and when the to-be-transmitted logic channel data with the highest priority level is incapable of being transmitted through the target preconfigured grant resource, transmitting the to-be-transmitted logic channel data through the dynamically-scheduled resource.

In a possible embodiment of the present disclosure, when the configuration indication information indicates that the priority level of the dynamically-scheduled resource allocated through the dynamic resource scheduling command is lower than the priority level of the preconfigured grant resource and the dynamically-scheduled resources at least partially overlap the preconfigured grant resources, the selecting the resource for the data transmission in accordance with the priority level information includes: when the target preconfigured grant resources at least partially overlap the dynamically-scheduled resources, detecting a mapping condition of the to-be-transmitted data in a cache and target preconfigured grant resources; when the to-be-transmitted data includes data capable of being transmitted through the target preconfigured grant resource, transmitting the to-be-transmitted data through the target preconfigured grant resource; and when the to-be-transmitted data does not include any data capable of being transmitted through the target preconfigured grant resource, transmitting the to-be-transmitted data through the dynamically-scheduled resource.

In yet another aspect, the present disclosure provides in some embodiments a base station, including a memory, a processor, and a program stored in the memory and executed by the processor. The processor is configured to execute the program so as to transmit configuration indication information to a terminal. The configuration indication information is configured to indicate priority level information about dynamically-scheduled resources and preconfigured grant resources when data transmission is performed by the terminal.

In still yet another aspect, the present disclosure provides in some embodiments a terminal, including a memory, a processor, and a program stored in the memory and executed by the processor. The processor is configured to execute the program so as to: acquire configuration indication information from a base station, the configuration indication information being configured to indicate priority level information about dynamically-scheduled resources and preconfigured grant resources when data transmission is performed by the terminal; and when the dynamically-scheduled resources at least partially overlap the preconfigured grant resources, select a resource for the data transmission in accordance with the priority level information.

In still yet another aspect, the present disclosure provides in some embodiments a resource configuration device for a base station, including an information transmission module configured to transmit configuration indication information to a terminal. The configuration indication information is configured to indicate priority level information about dynamically-scheduled resources and preconfigured grant resources when data transmission is performed by the terminal.

In still yet another aspect, the present disclosure provides in some embodiments a resource configuration device for a terminal, including: an information acquisition module configured to acquire configuration indication information from a base station, the configuration indication information being configured to indicate priority level information about dynamically-scheduled resources and preconfigured grant resources when data transmission is performed by the terminal; and a data transmission module configured to, when the dynamically-scheduled resources at least partially overlap the preconfigured grant resources, select a resource for the data transmission in accordance with the priority level information.

The present disclosure at least has the following beneficial effect. According to the resource configuration method in the embodiments of the present disclosure, the base station may transmit the configuration indication information indicating the priority levels of the dynamically-scheduled resource and the preconfigured grant resource to the terminal, so that the terminal may select the resource in accordance with the priority level for the data transmission. As a result, it is able to reduce the data transmission latency, and improve the service reliability.

BRIEF DESCRIPTION OF THE DRAWINGS

FIG. 1a is a flow chart of a resource configuration method according to one embodiment of the present disclosure;

FIG. 1b is a schematic view showing a preconfigured grant resource type according to one embodiment of the present disclosure;

FIG. 1c is a schematic view showing another preconfigured grant resource type according to one embodiment of the present disclosure;

DETAILED DESCRIPTION

Figure 2:
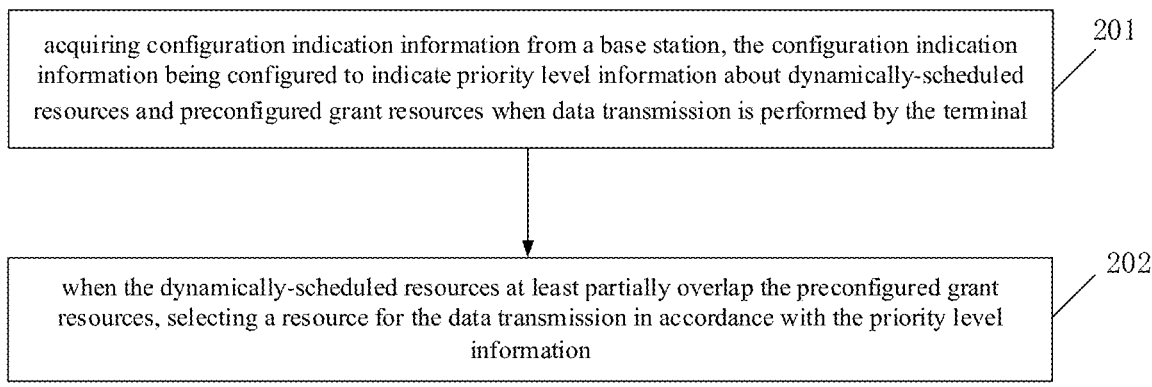
FIG. 2 is a flow chart of another resource configuration method according to one embodiment of the present disclosure.

In order to make the objects, the technical solutions and the advantages of the present disclosure more apparent, the present disclosure will be described hereinafter in a clear and complete manner in conjunction with the drawings and embodiments.

In the related art, a data processing time and a feedback time are too long, so it is impossible to meet the requirements of a low-latency and high-reliable service. In order to solve this problem, the present disclosure provides in some embodiments a resource configuration method applied for a base station which, as shown in FIG. 1a, includes Step 101 of transmitting configuration indication information to a terminal. The configuration indication information is configured to indicate priority level information about dynamically-scheduled resources and preconfigured grant resources when data transmission is performed by the terminal.

In this step, the base station may transmit the configuration indication information to the terminal, so that the terminal may select a resource for the data transmission in accordance with priority levels of the dynamically-scheduled resources and the preconfigured grant resources indicated in the configuration indication information.

The preconfigured grant resource is a resource which is allocated by a network for the terminal in advance and which does not need to be dynamically scheduled. In an NR system, types of the allocation of an uplink preconfigured resource may include type 1 and type 2.

In type 1, the base station may allocate a specific uplink resource for the terminal through RRC signaling, including a resource periodicity, a corresponding CS-RNTI, a time-frequency resource position, and a specific transmission format (e.g., MCS). The terminal may acquire a periodic uplink transmission resource in accordance with the configuration information and immediately transmit uplink data in accordance with the allocated periodic uplink transmission resource. During the configuration of a logic channel, whether the logic channel is capable of using a resource of the type 1 may also be configured, as shown in FIG. 1b.

In type 2, the base station may allocate the periodicity of the periodic uplink transmission resource and the CS-RNTI for the terminal through RRC signaling. Subsequently, the base station may activate or deactivate a preconfigured resource of the type 2 through a PDCCH command, and the base station may indicate a specific transmission resource, including a time-frequency resource and a transmission format, in the PDCCH command for activating the type 2, as shown in FIG. 1c.

Dynamic scheduling refers to single resource allocation performed by the base station for the terminal through the PDCCH command. In the uplink dynamic scheduling, the terminal may parse the time-frequency resource position and the transmission format indicated in the PDCCH command, and transmit the uplink data in a specified transmission format at the time-frequency resource position.

In the related art, the dynamic scheduling always takes precedence over the allocation of the preconfigured grant resource, so it is impossible to meet the requirements of a low-latency and high-reliable service in the NR system. In the embodiments of the present disclosure, the base station may transmit the configuration indication information to the terminal, so that the terminal may perform the data transmission flexibly in accordance with the configuration indication information. As a result, it is able to reduce the occurrence of a conflict between the dynamically-scheduled resource and the preconfigured grant resource, thereby to reduce the data transmission latency and improve the service reliability.

In a possible embodiment of the present disclosure, the configuration indication information may be transmitted to the terminal through RRC signaling or physical layer signaling.

In the embodiments of the present disclosure, the configuration indication information may be transmitted through the RRC signaling or physical layer signaling. For example, the base station may indicate, in the Configured Grant configuration information transmitted through the RRC signaling, that the configured grant of a type 1 and/or a type 2 may have a priority level higher than the dynamic scheduling. In this regard, it is able to improve the transmission efficiency as well as the resource utilization.

In a possible embodiment of the present disclosure, the configuration indication information is configured to indicate that a priority level of a target preconfigured grant resource is higher than a priority level of the dynamically-scheduled resource when the data transmission is performed by the terminal.

The target preconfigured grant resource may include one or more of the preconfigured grant resources, or one or more types of the preconfigured grant resources. For example, the target preconfigured grant resources may be preconfigured grant resources of the type 1, the type 2, or both.

In this regard, the base station may rank the priority levels of the preconfigured grant resources and the dynamically-scheduled resources according to the practical need, so as to improve ranking flexibility and the data transmission efficiency.

In a possible embodiment of the present disclosure, the configuration indication information may be transmitted to the terminal through RRC signaling for a configured grant resource, and the configuration indication information is configured to indicate that a priority level of the preconfigured grant resource configured by the configured grant resource is higher than a priority level of the dynamically-scheduled resource.

During the implementation, the configuration indication information may be specifically transmitted to the terminal through the RRC signaling for the configured grant resource. The configuration indication information may indicate that the priority level of the preconfigured grant resource is higher than the priority level of the dynamically-scheduled resource. The terminal may select the resource for the data transmission in accordance with the priority levels of the preconfigured grant resource and the dynamically-scheduled resource indicated by the base station, so as to reduce the occurrence of a data conflict and improve the data transmission efficiency.

In a possible embodiment of the present disclosure, when a plurality of preconfigured grant resources has been configured by the configured grant resource, the configuration indication information is configured to indicate that a priority level of each of a part of the preconfigured grant resources is higher than the priority level of the dynamically-scheduled resource.

During the implementation, the configuration indication information may indicate that the priority level of one or more of the plurality of preconfigured grant resources is higher than the priority level of the dynamically-scheduled resource. In this regard, the base station may rank the priority levels of the preconfigured grant resources and the dynamically-scheduled resources according to the practical need, so as to improve ranking flexibility and the data transmission efficiency, reduce the transmission latency, and improve the service reliability.

In a possible embodiment of the present disclosure, the configuration indication information is further configured to indicate priority levels of the plurality of preconfigured grant resources through indicating a correspondence between configured grant resource indices and priority levels, and each preconfigured grant resource index may correspond to a group of preconfigured grant resources.

During the implementation, when there is a plurality of preconfigured grant resources, the correspondence among the preconfigured grant resources may be further indicated. To be specific, a priority level of each preconfigured grant resource index may be determined through determining the correspondence between the preconfigured grant resource indices and the priority levels, so as to determine the priority levels of the preconfigured grant resources. In this regard, it is able to rapidly determine the priority levels of the preconfigured grant resources, and rank the priority levels efficiently.

In a possible embodiment of the present disclosure, the configuration indication information may be included in RRC signaling for configuring a logic channel, and configured to indicate that a priority level of the transmission of logic channel data through the preconfigured grant resource or one or more specified preconfigured grant resources is higher than a priority level of the transmission of the logic channel data through the dynamically-scheduled resource.

During the implementation, in a logic channel configuration transmitted through the RRC signaling, the base station may indicate that the transmission of the logic channel data through the preconfigured grant resource or one or more preconfigured grant resources has a higher priority level than the transmission through the dynamically-scheduled resource. In this regard, when data needs to be transmitted through the logic channel and a conflict occurs between the dynamically-scheduled resource and the preconfigured grant resource, the terminal may preferentially use the preconfigured grant resource with a higher priority level, so as to reduce the occurrence of the conflict between the dynamically-scheduled resource and the preconfigured grant resource, improve the data transmission efficiency, reduce the data transmission latency, and improve the service reliability.

In a possible embodiment of the present disclosure, when the configuration indication information indicates that the priority level of the data transmission through a plurality of preconfigured grant resources is higher than the priority level of the data transmission through the dynamically-scheduled resource, the configuration indication information is further configured to indicate priority levels of the transmission of logic channel data through the plurality of preconfigured grant resources.

During the implementation, the configuration indication information may further indicate the priority level of the transmission of the logic channel data through the plurality of preconfigured grant resources. To be specific, the configuration indication information may further indicate that the priority level of one or more configured grant resources for the logic channel data of a User Equipment (UE) is higher than that of the dynamically-scheduled resource, and/or indicate a relationship among the priority levels of the plurality of configured grant resources, specifically the grant resource indices are used for agreement and indication.

In this regard, when data needs to be transmitted through the logic channel and a conflict occurs between the dynamically-scheduled resource and the configured grant resource, the terminal may preferentially use the configured grant resource with a higher priority level, so as to reduce the conflict between the dynamically-scheduled resource and the configured grant resource, improve the data transmission efficiency, reduce the data transmission latency and improve the service reliability.

In a possible embodiment of the present disclosure, the configuration indication information is configured to indicate the terminal to select by itself priority levels of the dynamically-scheduled resource and the preconfigured grant resource when the data transmission is performed.

The configuration indication information may be transmitted to the terminal through RRC signaling.

During the implementation, the base station may indicate the terminal to select, by itself, the priority levels of the dynamically-scheduled resource and the preconfigured grant resource, so as to transmit the data flexibly and rank the priority levels flexibly, thereby to improve the data transmission efficiency, reduce the data transmission latency, and improve the service reliability.

In a possible embodiment of the present disclosure, the configuration indication information is configured to indicate the terminal to select by itself priority levels of the dynamically-scheduled resource and the target preconfigured grant resource for the transmission of target logic channel data when the data transmission is performed by the terminal.

The configuration indication information may be transmitted to the terminal through RRC signaling.

The target logic channel data may be preset or pre-agreed by the base station, or determine by the base station according to the practical need. The target logic channel data may include a part of or all of the logic channel data.

In this regard, the base station may indicate the terminal to select, by itself, the priority levels of the dynamically-scheduled resource and the target preconfigured grant resource for the transmission of the target logic channel data, so as to transmit the data flexibly and rank the priority levels flexibly, thereby to improve the data transmission efficiency, reduce the data transmission latency, and improve the service reliability.

In a possible embodiment of the present disclosure, the configuration indication information may be transmitted to the terminal through a PDCCH command for activating preconfigured grant, and the configuration indication information is configured to indicate that a priority level of a preconfigured grant resource activated through the PDCCH command is higher than the priority level of the dynamically-scheduled resource.

During the implementation, the base station may carry the configuration indication information in the PDCCH command for activating the preconfigured grant, specifically with respect to the preconfigured grant resource type 2.

In a possible embodiment of the present disclosure, the configuration indication information may be indicated through a specific field in DCI carried in the PDCCH command, or indicated through scrambling the PDCCH command with an additionally-configured C S-RNTI.

During the implementation, on the basis of the above, a transmission mode of the configuration indication information may be further defined. In this regard, it is able to improve the transmission efficiency as well as the resource utilization. For example, one bit of the DCI carried in the PDCCH command or the scrambling of the PDCCH command with the additionally-configured CS-RNTI may be used to indicate that the currently-activated configured grant has a priority higher than the dynamic scheduling.

In a possible embodiment of the present disclosure, the configuration indication information may be transmitted to the terminal through a dynamic resource scheduling command, and configured to indicate that the priority level of the dynamically-scheduled resource allocated through the dynamic resource scheduling command is higher than or lower than the priority level of the preconfigured grant resource.

During the implementation, usually there is a reason for the base station to perform the dynamic scheduling for the UE on resources where the preconfigured grant resources have been configured. For example, in a first case, the base station may consider that the configured resources are unsuitable for the data transmission, so it may allocate the other resources therefor. In a second case, when the configured resource is still used by a UE1 for the transmission, there may exist a transmission conflict between the UE1 and a UE2, i.e., data packets for the two terminals may not be transmitted correctly. Hence, in the embodiments of the present disclosure, the priority levels of the dynamically-scheduled resource and the preconfigured grant resource may be indicated through the dynamic scheduling command. To be specific, the configuration indication information may indicate that the priority level of the dynamically-scheduled resource is higher than or lower than the priority level of the preconfigured grant resource. In this regard, it is able to select the resource flexibly, and prevent the occurrence of the data conflict, thereby to improve the data transmission efficiency.

In a possible embodiment of the present disclosure, the configuration indication information is indicated through a specific field in DCI carried in the PDCCH command, or indicated through scrambling the PDCCH command with an additionally-configured CS-RNTI.

During the implementation, on the basis of the above, a transmission mode of the configuration indication information may be further defined, so as to improve the transmission efficiency as well as the resource utilization. For example, one bit of the DCI carried in the PDCCH command may be separately used to indicate that a current dynamic scheduling command must have a priority level higher than the configured grant, or the scrambling of the PDCCH command with the additionally-configured CS-RNTI may be used to indicate that the current dynamic scheduling command has a priority level higher than the configured grant. Alternatively, one bit of the DCI carried in the PDCCH command may be separately used to indicate that the current dynamic scheduling command may be pre-empted by the configured grant, i.e., have a priority level lower than the configured grant, or the scrambling of the PDCCH command with the additionally-configured CS-RNTI may be used to indicate that the current dynamic scheduling command may have a priority level lower than the configured grant.

The present disclosure further provides in some embodiments a resource configuration method applied for a terminal which, as shown in FIG. 2, includes: Step 201 of acquiring configuration indication information from a base station, the configuration indication information being configured to indicate priority level information about dynamically-scheduled resources and preconfigured grant resources when data transmission is performed by the terminal; and Step 202 of, when the dynamically-scheduled resources at least partially overlap the preconfigured grant resources, selecting a resource for the data transmission in accordance with the priority level information.

When the dynamically-scheduled resources at least partially overlap the preconfigured grant resources, time domains of the dynamically-scheduled resources may at least partially overlap time domains of the preconfigured grant resources, or time-frequency domains of the dynamically-scheduled resources may at least partially overlap time-frequency domains of the preconfigured grant resources, i.e., there are such a scenario where the time domains of the dynamically-scheduled resources at least partially overlap the time domains of the preconfigured grant resources but the resources completely do not overlap each other and a scenario where the time domains of the dynamically-scheduled resources at least partially overlap the time domains of the preconfigured grant resources but the resources partially or fully overlap each other.

When there is a conflict between uplink resources allocated through the dynamic scheduling command and received by a terminal side and configured grant uplink resources configured by a network side and taking precedence over the dynamically-scheduled resources, i.e., a part of or all of the resources overlap each other, the terminal may select the resource for the data transmission in accordance with the priority level information indicated in the received configuration indication information, so as to reduce the data conflict, improve the data transmission efficiency, reduce the data latency, and improve the service reliability.

In a possible embodiment of the present disclosure, the configuration indication information may be transmitted through RRC signaling or physical layer signaling.

In a possible embodiment of the present disclosure, the configuration indication information is configured to indicate that a priority level of a target preconfigured grant resource is higher than a priority level of the dynamically-scheduled resource when the data transmission is performed by the terminal.

In a possible embodiment of the present disclosure, the configuration indication information may be transmitted through RRC signaling for a configured grant resource, and the configuration indication information is configured to indicate that a priority level of the preconfigured grant resource configured by the configured grant resource is higher than a priority level of the dynamically-scheduled resource.

In a possible embodiment of the present disclosure, when a plurality of preconfigured grant resources has been configured by the configured grant resource, the configuration indication information is configured to indicate that a priority level of each of a part of the preconfigured grant resources is higher than the priority level of the dynamically-scheduled resource.

In a possible embodiment of the present disclosure, the configuration indication information is further configured to indicate priority levels of the plurality of preconfigured grant resources through indicating a correspondence between configured grant resource indices and priority levels, and each preconfigured grant resource index may correspond to a group of preconfigured grant resources.

In a possible embodiment of the present disclosure, the configuration indication information may be included in RRC signaling for configuring a logic channel, and configured to indicate that a priority level of the transmission of logic channel data through the preconfigured grant resource or one or more specified preconfigured grant resources is higher than a priority level of the transmission of the logic channel data through the dynamically-scheduled resource.

In a possible embodiment of the present disclosure, when the configuration indication information indicates that the priority level of the data transmission through a plurality of preconfigured grant resources is higher than the priority level of the data transmission through the dynamically-scheduled resource, the configuration indication information is further configured to indicate priority levels of the transmission of the logic channel data through the plurality of preconfigured grant resources.

In a possible embodiment of the present disclosure, the configuration indication information is configured to indicate the terminal to select by itself priority levels of the dynamically-scheduled resource and the preconfigured grant resource when the data transmission is performed.

In a possible embodiment of the present disclosure, when the configuration indication information indicates the terminal to perform the data transmission, the terminal may select by itself priority levels of the dynamically-scheduled resource and the target preconfigured grant resource for the transmission of target logic channel data.

In a possible embodiment of the present disclosure, the configuration indication information may be transmitted to the terminal through a PDCCH command for activating preconfigured grant, and the configuration indication information is configured to indicate that a priority level of a preconfigured grant resource activated through the PDCCH command is higher than the priority level of the dynamically-scheduled resource.

In a possible embodiment of the present disclosure, the configuration indication information may be transmitted to the terminal through a dynamic resource scheduling command, and configured to indicate that the priority level of the dynamically-scheduled resource allocated through the dynamic resource scheduling command is higher than or lower than the priority level of the preconfigured grant resource.

The implementation may refer to the relevant description mentioned hereinabove with a same technical effect, which will not be particularly defined herein.

In order to prevent the occurrence of the data transmission conflict, the base station may transmit the configuration indication information to the terminal, and there may exist the following circumstances for behaviors of the terminal depending on different configuration indications from the base station.

First Circumstance

When there is a conflict between uplink resources allocated through the dynamic scheduling command and received by the terminal side and uplink resources allocated through configured grant which is configured by the network side to take precedence over the dynamic scheduling, i.e., when the dynamically-scheduled resources partially or fully overlap the preconfigured grant resources, the terminal may select the resource for the data transmission in any of the following modes.

In a first mode, when the target preconfigured grant resources at least partially overlap the dynamically-scheduled resources, the terminal may select the target preconfigured grant resource for the data transmission.

In this mode, when the terminal has detected the conflict between the dynamically-scheduled resources and the configured grant resources and the econfigured grant resource has a priority level higher than the dynamically-scheduled resource, the econfigured grant resource may be used all the time and the dynamically-scheduled resource may be omitted. In this regard, it is able to reduce the data conflict, improve the data transmission efficiency, reduce the data latency and improve the service reliability.

In a second mode, when the target preconfigured grant resources at least partially overlap the dynamically-scheduled resources, a priority level of to-be-transmitted logic channel data in a cache may be detected; when the to-be-transmitted logic channel data with a highest priority level is capable of being transmitted through the target preconfigured grant resource, the to-be-transmitted logic channel data may be transmitted through the target preconfigured grant resource; and when the to-be-transmitted logic channel data with the highest priority level is incapable of being transmitted through the target preconfigured grant resource, the to-be-transmitted logic channel data may be transmitted through the dynamically-scheduled resource.

In a third mode, when the target preconfigured grant resources at least partially overlap the dynamically-scheduled resources, a mapping condition of to-be-transmitted data and target preconfigured grant resources in a cache may be detected; when the to-be-transmitted data includes data capable of being transmitted through the target preconfigured grant resource, the to-be-transmitted data may be transmitted through the target preconfigured grant resource; and when the to-be-transmitted data does not include any data capable of being transmitted through the target preconfigured grant resource, the to-be-transmitted data may be transmitted through the dynamically-scheduled resource.

During the implementation, when the econfigured grant resource is used by the terminal preferentially, the terminal may preferentially transmit the logic channel data in the cache which is merely capable of being transmitted in a configuration of the configured grant resource (e.g., a PUSCH length or Subcarrier Spacing (SCS)).

Through the above three modes, it is able to determine the priority levels of the target preconfigured grant resource and the dynamically-scheduled resource, thereby to reduce the data conflict and improve the data transmission efficiency.

Second Circumstance

When there is a conflict between the uplink resources allocated through the dynamical scheduling command and received by the terminal side and the econfigured grant resources, the terminal may perform the processing in any one of the following modes.

In a first mode, when the target preconfigured grant resources at least partially overlap the dynamically-scheduled resources, whether a logic channel with a highest priority level in logic channels to which the to-be-transmitted data belongs in a cache is capable of using the target preconfigured grant resource may be detected; when the logic channel with the highest priority level is capable of using the target preconfigured grant resource, the to-be-transmitted data may be transmitted through the target preconfigured grant resource; and when the logic channel with the highest priority level is incapable of using the target preconfigured grant resource, the to-be-transmitted data may be transmitted through the dynamically-scheduled resource.

In a second mode, when the target preconfigured grant resources at least partially overlap the dynamically-scheduled resources, whether logic channels to which the to-be-transmitted data belongs in a cache include a logic channel capable of using the target preconfigured grant resource may be detected; when the logic channels include the logic channel capable of using the target preconfigured grant resource, the to-be-transmitted data may be transmitted through the target preconfigured grant resource; and when the logic channels do not include the logic channel capable of using the target preconfigured grant resource, the to-be-transmitted data may be transmitted through the dynamically-scheduled resource.

In this mode, further, when the terminal has determined that the econfigured grant resource is to be used, the terminal may preferentially transmit the data for the logic channel which is merely capable of using the preconfigured grant resource, i.e., the terminal may not organize the data in accordance with a strict priority level of the logic channel.

Third Circumstance

When there is a conflict between the uplink resources allocated through the dynamic scheduling command and received by the terminal side and the uplink resources allocated through the configured grant and the terminal is configured to determine by itself the priority levels of the configured grant resources and the dynamically-scheduled resources, the terminal may perform the processing as follows. When the target preconfigured grant resources at least partially overlap the dynamically-scheduled resources, the terminal may select the target preconfigured grant resource or the dynamically-scheduled resource as a prior resource for the to-be-transmitted data in accordance with a correspondence among positions of the target preconfigured grant resources, positions of the dynamically-scheduled resources, and logic channels in the cache.

During the implementation, the terminal may further make a decision in accordance with the following principle. When the configured resource has a very short periodicity and a next configured resource is provided within a short time period after a current resource conflict, the dynamic scheduling may take precedence; and when the data cached in the terminal includes data with a very small latency requirement, the configured resource may take precedence. When the terminal is configured to select by itself the priority levels of the preconfigured grant resources and the dynamically-scheduled resources with respect to a part of the logic channels for the terminal, the terminal may determine whether there is the logic channel data in a data cache, and if yes, the terminal may determine by itself whether the preconfigured grant resource or the dynamically-scheduled resource takes precedence. For example, when the configured resource has a very short periodicity and a next configured resource is provided immediately after the current resource conflict, the dynamic scheduling may take precedence.

Fourth Circumstance

In this circumstance, there is a conflict between the uplink resources allocated through the dynamic scheduling command and received by the terminal side and a currently-activated configured grant resource.

When the configuration indication information indicates that the priority level of the dynamically-scheduled resource allocated through the dynamic resource scheduling command is higher than the priority level of the preconfigured grant resource and the dynamically-scheduled resources at least partially overlap the preconfigured grant resources, the terminal may perform the processing as follows. When the target preconfigured grant resources at least partially overlap the dynamically-scheduled resources, the to-be-transmitted data may be transmitted through the dynamically-scheduled resource.

When the configuration indication information indicates that the priority level of the dynamically-scheduled resource allocated through the dynamic resource scheduling command is lower than the priority level of the preconfigured grant resource and the dynamically-scheduled resources at least partially overlap the preconfigured grant resources, the terminal may perform the processing in any of the following modes.

In a first mode, when the target preconfigured grant resources at least partially overlap the dynamically-scheduled resources, a priority level of to-be-transmitted logic channel data in a cache may be detected; when the to-be-transmitted logic channel data with a highest priority level is capable of being transmitted through the target preconfigured grant resource, the to-be-transmitted logic channel data may be transmitted through the target preconfigured grant resource; and when the to-be-transmitted logic channel data with the highest priority level is incapable of being transmitted through the target preconfigured grant resource, the to-be-transmitted logic channel data may be transmitted through the dynamically-scheduled resource.

In a second mode, when the configuration indication information indicates that the priority level of the dynamically-scheduled resource allocated through the dynamic resource scheduling command is lower than the priority level of the preconfigured grant resource and the dynamically-scheduled resources at least partially overlap the preconfigured grant resources, the terminal may perform the processing as follows. When the target preconfigured grant resources at least partially overlap the dynamically-scheduled resources, a mapping condition of the to-be-transmitted data and target preconfigured grant resources in a cache may be detected; when the to-be-transmitted data includes data capable of being transmitted through the target preconfigured grant resource, the to-be-transmitted data may be transmitted through the target preconfigured grant resource; and when the to-be-transmitted data does not include any data capable of being transmitted through the target preconfigured grant resource, the to-be-transmitted data may be transmitted through the dynamically-scheduled resource.

The first mode may be different from the second mode. With respect to the second mode, further, when the configured grant resource is to be used preferentially by the terminal, the terminal may preferentially transmit the logic channel data in the cache which is merely capable of being transmitted in a configuration of the configured grant resource (e.g., a PUSCH length or an SCS).

According to the resource configuration method in the embodiments of the present disclosure, in the case that there is the conflict between the dynamically-scheduled resources and the configured grant resources, the terminal may use the uplink resource appropriately in the above-mentioned modes, so as to perform the service transmission while improving the resource utilization, thereby to meet the requirements of a low-latency and high-reliable service on low latency and reliability.

Figure 3:
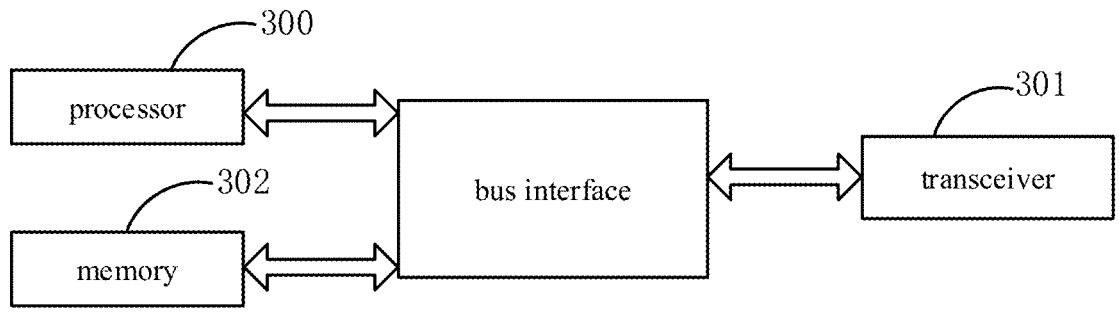
FIG. 3 is a schematic view showing a base station according to one embodiment of the present disclosure.

As shown in FIG. 3, the present disclosure further provides in some embodiments a base station, which includes a transceiver 301, a memory 302, a processor 300, and a program stored in the memory 302 and executed by the processor 300. The processor 300 is configured to call and execute the program and date in the memory 302.

The transceiver 301 is configured to receive and transmit data under the control of the processor 300. To be specific, the processor 300 is configured to read the program in the memory 302, so as to transmit configuration indication information to a terminal. The configuration indication information is configured to indicate priority level information about dynamically-scheduled resources and preconfigured grant resources when data transmission is performed by the terminal.

In a possible embodiment of the present disclosure, the configuration indication information may be transmitted to the terminal through RRC signaling or physical layer signaling.

In a possible embodiment of the present disclosure, the configuration indication information is configured to indicate that a priority level of a target preconfigured grant resource is higher than a priority level of the dynamically-scheduled resource when the data transmission is performed by the terminal.

In a possible embodiment of the present disclosure, the configuration indication information may be transmitted to the terminal through RRC signaling for a configured grant resource, and the configuration indication information is configured to indicate that a priority level of the preconfigured grant resource configured by the configured grant resource is higher than a priority level of the dynamically-scheduled resource.

In a possible embodiment of the present disclosure, when a plurality of preconfigured grant resources has been configured by the configured grant resource, the configuration indication information is configured to indicate that a priority level of each of a part of the preconfigured grant resources is higher than the priority level of the dynamically-scheduled resource.

In a possible embodiment of the present disclosure, the configuration indication information is further configured to indicate priority levels of the plurality of preconfigured grant resources through indicating a correspondence between configured grant resource indices and priority levels, and each preconfigured grant resource index may correspond to a group of preconfigured grant resources.

In a possible embodiment of the present disclosure, the configuration indication information may be included in RRC signaling for configuring a logic channel, and configured to indicate that a priority level of the transmission of logic channel data through the preconfigured grant resource or one or more specified preconfigured grant resources is higher than a priority level of the transmission of the logic channel data through the dynamically-scheduled resource.

In a possible embodiment of the present disclosure, when the configuration indication information indicates that the priority level of the data transmission through a plurality of preconfigured grant resources is higher than the priority level of the data transmission through the dynamically-scheduled resource, the configuration indication information is further configured to indicate priority levels of the transmission of logic channel data through the plurality of preconfigured grant resources.

In a possible embodiment of the present disclosure, the configuration indication information is configured to indicate the terminal to select by itself priority levels of the dynamically-scheduled resource and the preconfigured grant resource when the data transmission is performed.

In a possible embodiment of the present disclosure, the configuration indication information is configured to indicate the terminal to select by itself priority levels of the dynamically-scheduled resource and the target preconfigured grant resource for the transmission of target logic channel data when the data transmission is performed by the terminal.

In a possible embodiment of the present disclosure, the configuration indication information is transmitted to the terminal through RRC signaling.

In a possible embodiment of the present disclosure, the configuration indication information may be transmitted to the terminal through a PDCCH command for activating preconfigured grant, and the configuration indication information is configured to indicate that a priority level of a preconfigured grant resource activated through the PDCCH command is higher than the priority level of the dynamically-scheduled resource.

In a possible embodiment of the present disclosure, the configuration indication information is indicated through a specific field in DCI carried in the PDCCH command, or indicated through scrambling the PDCCH command with an additionally-configured CS-RNTI.

In a possible embodiment of the present disclosure, the configuration indication information may be transmitted to the terminal through a dynamic resource scheduling command, and configured to indicate that the priority level of the dynamically-scheduled resource allocated through the dynamic resource scheduling command is higher than or lower than the priority level of the preconfigured grant resource.

In a possible embodiment of the present disclosure, the configuration indication information is indicated through a specific field in DCI carried in the PDCCH command, or indicated through scrambling the PDCCH command with an additionally-configured CS-RNTI.

In FIG. 3, bus architecture may include a number of buses and bridges connected to each other, so as to connect various circuits for one or more processors 300 and one or more memories 302. In addition, as is known in the art, the bus architecture may be used to connect any other circuits, such as a circuit for a peripheral device, a circuit for a voltage stabilizer and a power management circuit. A bus interface may be provided, and the transceiver 301 may consist of a plurality of elements, i.e., a transmitter and a receiver for communication with any other devices over a transmission medium. The processor 300 may take charge of managing the bus architecture as well as general processings. The memory 302 may store therein data for the operation of the processor 300.

It should be appreciated that, all of, or parts of, the steps may be implemented through hardware, or implemented through relevant hardware under the control of a computer program. The computer program may include instructions for executing parts of, or all of, the steps of the method, and it may be stored in a computer-readable storage medium in any form.

Figure 4:
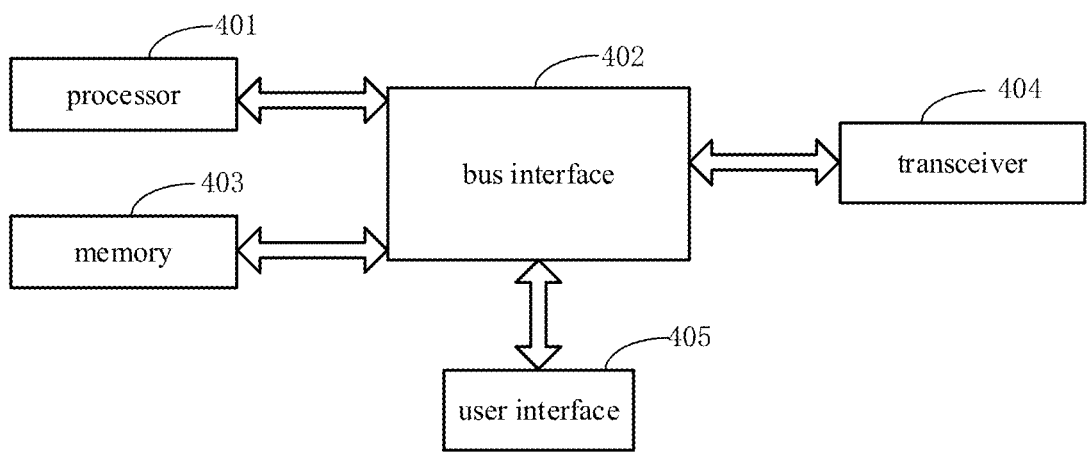
FIG. 4 is a schematic view showing a terminal according to one embodiment of the present disclosure.

The present disclosure further provides in some embodiments a terminal, which as shown in FIG. 4, includes a processor 401, and a memory 403 connected to the processor 401 via a bus interface 402 and storing therein programs and data for the operation of the processor 401. The processor 401 is configured to call and execute the programs and data in the memory 403.

The transceiver 404 is connected to the bus interface 402, and configured to receive and transmit data under the control of the processor 401. To be specific, the processor 401 is configured to read the programs in the memory 403, so as to: acquire configuration indication information from a base station, the configuration indication information being configured to indicate priority level information about dynamically-scheduled resources and preconfigured grant resources when data transmission is performed by the terminal; and when the dynamically-scheduled resources at least partially overlap the preconfigured grant resources, select a resource for the data transmission in accordance with the priority level information.

In a possible embodiment of the present disclosure, the configuration indication information may be transmitted through RRC signaling or physical layer signaling.

In a possible embodiment of the present disclosure, the configuration indication information is configured to indicate that a priority level of a target preconfigured grant resource is higher than a priority level of the dynamically-scheduled resource when the data transmission is performed by the terminal.

In a possible embodiment of the present disclosure, the configuration indication information may be transmitted through RRC signaling for a configured grant resource, and the configuration indication information is configured to indicate that a priority level of the preconfigured grant resource configured by the configured grant resource is higher than a priority level of the dynamically-scheduled resource.

In a possible embodiment of the present disclosure, when a plurality of preconfigured grant resources has been configured by the configured grant resource, the configuration indication information is configured to indicate that a priority level of each of a part of the preconfigured grant resources is higher than the priority level of the dynamically-scheduled resource.

In a possible embodiment of the present disclosure, the configuration indication information is further configured to indicate priority levels of the plurality of preconfigured grant resources through indicating a correspondence between configured grant resource indices and priority levels, and each preconfigured grant resource index may correspond to a group of preconfigured grant resources.

In a possible embodiment of the present disclosure, the configuration indication information may be included in RRC signaling for configuring a logic channel, and configured to indicate that a priority level of the transmission of logic channel data through the preconfigured grant resource or one or more specified preconfigured grant resources is higher than a priority level of the transmission of the logic channel data through the dynamically-scheduled resource.

In a possible embodiment of the present disclosure, when the configuration indication information indicates that the priority level of the data transmission through a plurality of preconfigured grant resources is higher than the priority level of the data transmission through the dynamically-scheduled resource, the configuration indication information is further configured to indicate priority levels of the transmission of the logic channel data through the plurality of preconfigured grant resources.

In a possible embodiment of the present disclosure, the configuration indication information is configured to indicate the terminal to select by itself priority levels of the dynamically-scheduled resource and the preconfigured grant resource when the data transmission is performed.

In a possible embodiment of the present disclosure, when the configuration indication information indicates the terminal to perform the data transmission, the terminal may select by itself priority levels of the dynamically-scheduled resource and the target preconfigured grant resource for the transmission of target logic channel data.

In a possible embodiment of the present disclosure, the configuration indication information may be transmitted to the terminal through a PDCCH command for activating preconfigured grant, and the configuration indication information is configured to indicate that a priority level of a preconfigured grant resource activated through the PDCCH command is higher than the priority level of the dynamically-scheduled resource.

In a possible embodiment of the present disclosure, the configuration indication information may be transmitted to the terminal through a dynamic resource scheduling command, and configured to indicate that the priority level of the dynamically-scheduled resource allocated through the dynamic resource scheduling command is higher than or lower than the priority level of the preconfigured grant resource.

In a possible embodiment of the present disclosure, the processor 401 is further configured to, when the target preconfigured grant resources at least partially overlap the dynamically-scheduled resources, perform the data transmission through the target preconfigured grant resource.

In a possible embodiment of the present disclosure, the processor 401 is further configured to: when the target preconfigured grant resources at least partially overlap the dynamically-scheduled resources, detect a priority level of to-be-transmitted logic channel data in a cache; when the to-be-transmitted logic channel data with a highest priority level is capable of being transmitted through the target preconfigured grant resource, transmit the to-be-transmitted logic channel data through the target preconfigured grant resource; and when the to-be-transmitted logic channel data with the highest priority level is incapable of being transmitted through the target preconfigured grant resource, transmit the to-be-transmitted logic channel data through the dynamically-scheduled resource.

In a possible embodiment of the present disclosure, the processor 401 is further configured to: when the target preconfigured grant resources at least partially overlap the dynamically-scheduled resources, detect a mapping condition of to-be-transmitted data and target preconfigured grant resources in a cache; when the to-be-transmitted data includes data capable of being transmitted through the target preconfigured grant resource, transmit the to-be-transmitted data through the target preconfigured grant resource; and when the to-be-transmitted data does not include any data capable of being transmitted through the target preconfigured grant resource, transmit the to-be-transmitted data through the dynamically-scheduled resource.

In a possible embodiment of the present disclosure, the processor 401 is further configured to: when the target preconfigured grant resources at least partially overlap the dynamically-scheduled resources, detect whether a logic channel with a highest priority level in logic channels to which the to-be-transmitted data belongs in a cache is capable of using the target preconfigured grant resource; when the logic channel with the highest priority level is capable of using the target preconfigured grant resource, transmit the to-be-transmitted data through the target preconfigured grant resource; and when the logic channel with the highest priority level is incapable of using the target preconfigured grant resource, transmit the to-be-transmitted data through the dynamically-scheduled resource.

In a possible embodiment of the present disclosure, the processor 401 is further configured to: when the target preconfigured grant resources at least partially overlap the dynamically-scheduled resources, detect whether logic channels to which the to-be-transmitted data belongs in a cache include a logic channel capable of using the target preconfigured grant resource; when the logic channels include the logic channel capable of using the target preconfigured grant resource, transmit the to-be-transmitted data through the target preconfigured grant resource; and when the logic channels do not include the logic channel capable of using the target preconfigured grant resource, transmit the to-be-transmitted data through the dynamically-scheduled resource.

In a possible embodiment of the present disclosure, the processor 401 is further configured to, when the target preconfigured grant resources at least partially overlap the dynamically-scheduled resources, select the target preconfigured grant resource or the dynamically-scheduled resource as a prior resource for the to-be-transmitted data in accordance with a correspondence among positions of the target preconfigured grant resources, positions of the dynamically-scheduled resources, and logic channels in the cache.

In a possible embodiment of the present disclosure, when the configuration indication information indicates that the priority level of the dynamically-scheduled resource allocated through the dynamic resource scheduling command is higher than the priority level of the preconfigured grant resource and the dynamically-scheduled resources at least partially overlap the preconfigured grant resources, the processor 401 is further configured to, when the target preconfigured grant resources at least partially overlap the dynamically-scheduled resources, transmit the to-be-transmitted data through the dynamically-scheduled resource.

In a possible embodiment of the present disclosure, when the configuration indication information indicates that the priority level of the dynamically-scheduled resource allocated through the dynamic resource scheduling command is lower than the priority level of the preconfigured grant resource and the dynamically-scheduled resources at least partially overlap the preconfigured grant resources, the processor 401 is further configured to: when the target preconfigured grant resources at least partially overlap the dynamically-scheduled resources, detect a priority level of to-be-transmitted logic channel data in a cache; when the to-be-transmitted logic channel data with a highest priority level is capable of being transmitted through the target preconfigured grant resource, transmit the to-be-transmitted logic channel data through the target preconfigured grant resource; and when the to-be-transmitted logic channel data with the highest priority level is incapable of being transmitted through the target preconfigured grant resource, transmit the to-be-transmitted logic channel data through the dynamically-scheduled resource.

In a possible embodiment of the present disclosure, when the configuration indication information indicates that the priority level of the dynamically-scheduled resource allocated through the dynamic resource scheduling command is lower than the priority level of the preconfigured grant resource and the dynamically-scheduled resources at least partially overlap the preconfigured grant resources, the processor 401 is further configured to: when the target preconfigured grant resources at least partially overlap the dynamically-scheduled resources, detect a mapping condition of the to-be-transmitted data and target preconfigured grant resources in a cache; when the to-be-transmitted data includes data capable of being transmitted through the target preconfigured grant resource, transmit the to-be-transmitted data through the target preconfigured grant resource; and when the to-be-transmitted data does not include any data capable of being transmitted through the target preconfigured grant resource, transmit the to-be-transmitted data through the dynamically-scheduled resource.

It should be appreciated that, in FIG. 4, bus architecture may include a number of buses and bridges connected to each other, so as to connect various circuits for one or more processors 401 and one or more memories 403. In addition, as is known in the art, the bus architecture may be used to connect any other circuits, such as a circuit for a peripheral device, a circuit for a voltage stabilizer and a power management circuit. The bus interface may be provided, and the transceiver 404 may consist of a plurality of elements, i.e., a transmitter and a receiver for communication with any other devices over a transmission medium. With respect to different terminals, a user interface 405 may also be provided for devices which are to be arranged inside or outside the terminal, and these devices may include but not limited to a keypad, a display, a speaker, a microphone and a joystick. The processor 401 may take charge of managing the bus architecture as well as general processings. The memory 403 may store therein data for the operation of the processor 401.

It should be appreciated that, all of, or parts of, the steps may be implemented through hardware, or implemented through relevant hardware under the control of a computer program. The computer program may include instructions for executing parts of, or all of, the steps of the method, and it may be stored in a computer-readable storage medium in any form.

Figure 5:
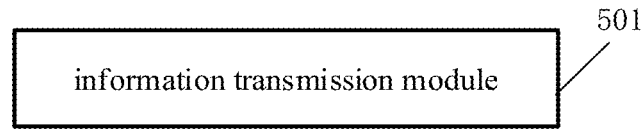
FIG. 5 is a schematic view showing a resource configuration device at a base station side according to one embodiment of the present disclosure.

The present disclosure further provides in some embodiments a resource configuration device applied for a base station which, as shown in FIG. 5, includes an information transmission module 501 configured to transmit configuration indication information to a terminal. The configuration indication information is configured to indicate priority level information about dynamically-scheduled resources and preconfigured grant resources when data transmission is performed by the terminal.

In a possible embodiment of the present disclosure, the configuration indication information may be transmitted to the terminal through RRC signaling or physical layer signaling.

In a possible embodiment of the present disclosure, the configuration indication information is configured to indicate that a priority level of a target preconfigured grant resource is higher than a priority level of the dynamically-scheduled resource when the data transmission is performed by the terminal.

In a possible embodiment of the present disclosure, the configuration indication information may be transmitted to the terminal through RRC signaling for a configured grant resource, and the configuration indication information is configured to indicate that a priority level of the preconfigured grant resource configured by the configured grant resource is higher than a priority level of the dynamically-scheduled resource.

In a possible embodiment of the present disclosure, when a plurality of preconfigured grant resources has been configured by the configured grant resource, the configuration indication information is configured to indicate that a priority level of each of a part of the preconfigured grant resources is higher than the priority level of the dynamically-scheduled resource.

In a possible embodiment of the present disclosure, the configuration indication information is further configured to indicate priority levels of the plurality of preconfigured grant resources through indicating a correspondence between configured grant resource indices and priority levels, and each preconfigured grant resource index may correspond to a group of preconfigured grant resources.

In a possible embodiment of the present disclosure, the configuration indication information may be included in RRC signaling for configuring a logic channel, and configured to indicate that a priority level of the transmission of logic channel data through the preconfigured grant resource or one or more specified preconfigured grant resources is higher than a priority level of the transmission of the logic channel data through the dynamically-scheduled resource.

In a possible embodiment of the present disclosure, when the configuration indication information indicates that the priority level of the data transmission through a plurality of preconfigured grant resources is higher than the priority level of the data transmission through the dynamically-scheduled resource, the configuration indication information is further configured to indicate priority levels of the transmission of logic channel data through the plurality of preconfigured grant resources.

In a possible embodiment of the present disclosure, the configuration indication information is configured to indicate the terminal to select by itself priority levels of the dynamically-scheduled resource and the preconfigured grant resource when the data transmission is performed.

In a possible embodiment of the present disclosure, the configuration indication information is configured to indicate the terminal to select by itself priority levels of the dynamically-scheduled resource and the target preconfigured grant resource for the transmission of target logic channel data when the data transmission is performed by the terminal.

In a possible embodiment of the present disclosure, the configuration indication information is transmitted to the terminal through RRC signaling.

In a possible embodiment of the present disclosure, the configuration indication information may be transmitted to the terminal through a PDCCH command for activating preconfigured grant, and the configuration indication information is configured to indicate that a priority level of a preconfigured grant resource activated through the PDCCH command is higher than the priority level of the dynamically-scheduled resource.

In a possible embodiment of the present disclosure, the configuration indication information is indicated through a specific field in DCI carried in the PDCCH command, or indicated through scrambling the PDCCH command with an additionally-configured CS-RNTI.

In a possible embodiment of the present disclosure, the configuration indication information may be transmitted to the terminal through a dynamic resource scheduling command, and configured to indicate that the priority level of the dynamically-scheduled resource allocated through the dynamic resource scheduling command is higher than or lower than the priority level of the preconfigured grant resource.

In a possible embodiment of the present disclosure, the configuration indication information is indicated through a specific field in DCI carried in the PDCCH command, or indicated through scrambling the PDCCH command with an additionally-configured CS-RNTI.

Figure 6:
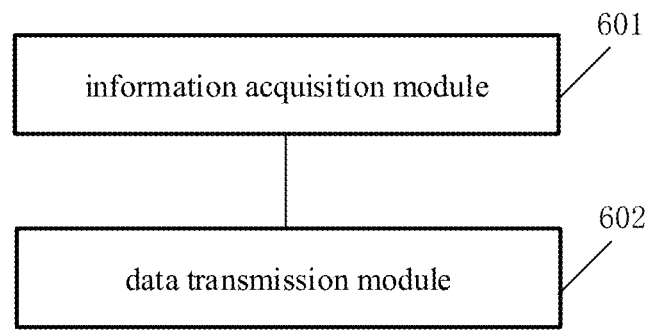
FIG. 6 is a schematic view showing a resource configuration device at a terminal side according to one embodiment of the present disclosure.

The present disclosure further provides in some embodiments a resource configuration device for a terminal which, as shown in FIG. 6, includes: an information acquisition module 601 configured to acquire configuration indication information from a base station, the configuration indication information being configured to indicate priority level information about dynamically-scheduled resources and preconfigured grant resources when data transmission is performed by the terminal; and a data transmission module 602 configured to, when the dynamically-scheduled resources at least partially overlap the preconfigured grant resources, select a resource for the data transmission in accordance with the priority level information.

In a possible embodiment of the present disclosure, the configuration indication information may be transmitted through RRC signaling or physical layer signaling.

In a possible embodiment of the present disclosure, the configuration indication information is configured to indicate that a priority level of a target preconfigured grant resource is higher than a priority level of the dynamically-scheduled resource when the data transmission is performed by the terminal.

In a possible embodiment of the present disclosure, the configuration indication information may be transmitted through RRC signaling for a configured grant resource, and the configuration indication information is configured to indicate that a priority level of the preconfigured grant resource configured by the configured grant resource is higher than a priority level of the dynamically-scheduled resource.

In a possible embodiment of the present disclosure, when a plurality of preconfigured grant resources has been configured by the configured grant resource, the configuration indication information is configured to indicate that a priority level of each of a part of the preconfigured grant resources is higher than the priority level of the dynamically-scheduled resource.

In a possible embodiment of the present disclosure, the configuration indication information is further configured to indicate priority levels of the plurality of preconfigured grant resources through indicating a correspondence between configured grant resource indices and priority levels, and each preconfigured grant resource index may correspond to a group of preconfigured grant resources.

In a possible embodiment of the present disclosure, the configuration indication information may be included in RRC signaling for configuring a logic channel, and configured to indicate that a priority level of the transmission of logic channel data through the preconfigured grant resource or one or more specified preconfigured grant resources is higher than a priority level of the transmission of the logic channel data through the dynamically-scheduled resource.

In a possible embodiment of the present disclosure, when the configuration indication information indicates that the priority level of the data transmission through a plurality of preconfigured grant resources is higher than the priority level of the data transmission through the dynamically-scheduled resource, the configuration indication information is further configured to indicate priority levels of the transmission of the logic channel data through the plurality of preconfigured grant resources.

In a possible embodiment of the present disclosure, the configuration indication information is configured to indicate the terminal to select by itself priority levels of the dynamically-scheduled resource and the preconfigured grant resource when the data transmission is performed.

In a possible embodiment of the present disclosure, when the configuration indication information indicates the terminal to perform the data transmission, the terminal may select by itself priority levels of the dynamically-scheduled resource and the target preconfigured grant resource for the transmission of target logic channel data.

In a possible embodiment of the present disclosure, the configuration indication information may be transmitted to the terminal through a PDCCH command for activating preconfigured grant, and the configuration indication information is configured to indicate that a priority level of a preconfigured grant resource activated through the PDCCH command is higher than the priority level of the dynamically-scheduled resource.

In a possible embodiment of the present disclosure, the configuration indication information may be transmitted to the terminal through a dynamic resource scheduling command, and configured to indicate that the priority level of the dynamically-scheduled resource allocated through the dynamic resource scheduling command is higher than or lower than the priority level of the preconfigured grant resource.

In a possible embodiment of the present disclosure, when selecting the resource for the data transmission in accordance with the priority level information, the data transmission module 602 is further configured to, when the target preconfigured grant resources at least partially overlap the dynamically-scheduled resources, perform the data transmission through the target preconfigured grant resource.

In a possible embodiment of the present disclosure, when selecting the resource for the data transmission in accordance with the priority level information, the data transmission module 602 is further configured to: when the target preconfigured grant resources at least partially overlap the dynamically-scheduled resources, detect a priority level of to-be-transmitted logic channel data in a cache; when the to-be-transmitted logic channel data with a highest priority level is capable of being transmitted through the target preconfigured grant resource, transmit the to-be-transmitted logic channel data through the target preconfigured grant resource; and when the to-be-transmitted logic channel data with the highest priority level is incapable of being transmitted through the target preconfigured grant resource, transmit the to-be-transmitted logic channel data through the dynamically-scheduled resource.

In a possible embodiment of the present disclosure, when selecting the resource for the data transmission in accordance with the priority level information, the data transmission module 602 is further configured to: when the target preconfigured grant resources at least partially overlap the dynamically-scheduled resources, detect a mapping condition of to-be-transmitted data and target preconfigured grant resources in a cache; when the to-be-transmitted data includes data capable of being transmitted through the target preconfigured grant resource, transmit the to-be-transmitted data through the target preconfigured grant resource; and when the to-be-transmitted data does not include any data capable of being transmitted through the target preconfigured grant resource, transmit the to-be-transmitted data through the dynamically-scheduled resource.

In a possible embodiment of the present disclosure, when selecting the resource for the data transmission in accordance with the priority level information, the data transmission module 602 is further configured to: when the target preconfigured grant resources at least partially overlap the dynamically-scheduled resources, detect whether a logic channel with a highest priority level in logic channels to which the to-be-transmitted data belongs in a cache is capable of using the target preconfigured grant resource; when the logic channel with the highest priority level is capable of using the target preconfigured grant resource, transmit the to-be-transmitted data through the target preconfigured grant resource; and when the logic channel with the highest priority level is incapable of using the target preconfigured grant resource, transmit the to-be-transmitted data through the dynamically-scheduled resource.

In a possible embodiment of the present disclosure, when selecting the resource for the data transmission in accordance with the priority level information, the data transmission module 602 is further configured to: when the target preconfigured grant resources at least partially overlap the dynamically-scheduled resources, detect whether logic channels to which the to-be-transmitted data belongs in a cache include a logic channel capable of using the target preconfigured grant resource; when the logic channels include the logic channel capable of using the target preconfigured grant resource, transmit the to-be-transmitted data through the target preconfigured grant resource; and when the logic channels do not include the logic channel capable of using the target preconfigured grant resource, transmit the to-be-transmitted data through the dynamically-scheduled resource.

In a possible embodiment of the present disclosure, when selecting the resource for the data transmission in accordance with the priority level information, the data transmission module 602 is further configured to, when the target preconfigured grant resources at least partially overlap the dynamically-scheduled resources, select the target preconfigured grant resource or the dynamically-scheduled resource as a prior resource for the to-be-transmitted data in accordance with a correspondence among positions of the target preconfigured grant resources, positions of the dynamically-scheduled resources, and logic channels in the cache.

In a possible embodiment of the present disclosure, when the configuration indication information indicates that the priority level of the dynamically-scheduled resource allocated through the dynamic resource scheduling command is higher than the priority level of the preconfigured grant resource and the dynamically-scheduled resources at least partially overlap the preconfigured grant resources, the data transmission module 602 is further configured to, when the target preconfigured grant resources at least partially overlap the dynamically-scheduled resources, transmit the to-be-transmitted data through the dynamically-scheduled resource.

In a possible embodiment of the present disclosure, when the configuration indication information indicates that the priority level of the dynamically-scheduled resource allocated through the dynamic resource scheduling command is lower than the priority level of the preconfigured grant resource and the dynamically-scheduled resources at least partially overlap the preconfigured grant resources, the data transmission module 602 is further configured to: when the target preconfigured grant resources at least partially overlap the dynamically-scheduled resources, detect a priority level of to-be-transmitted logic channel data in a cache; when the to-be-transmitted logic channel data with a highest priority level is capable of being transmitted through the target preconfigured grant resource, transmit the to-be-transmitted logic channel data through the target preconfigured grant resource; and when the to-be-transmitted logic channel data with the highest priority level is incapable of being transmitted through the target preconfigured grant resource, transmit the to-be-transmitted logic channel data through the dynamically-scheduled resource.

In a possible embodiment of the present disclosure, when the configuration indication information indicates that the priority level of the dynamically-scheduled resource allocated through the dynamic resource scheduling command is lower than the priority level of the preconfigured grant resource and the dynamically-scheduled resources at least partially overlap the preconfigured grant resources, the data transmission module 602 is further configured to: when the target preconfigured grant resources at least partially overlap the dynamically-scheduled resources, detect a mapping condition of the to-be-transmitted data and target preconfigured grant resources in a cache; when the to-be-transmitted data includes data capable of being transmitted through the target preconfigured grant resource, transmit the to-be-transmitted data through the target preconfigured grant resource; and when the to-be-transmitted data does not include any data capable of being transmitted through the target preconfigured grant resource, transmit the to-be-transmitted data through the dynamically-scheduled resource.

The present disclosure further provides in some embodiments a computer-readable storage medium storing therein a computer program. The computer program is executed by a processor, so as to implement the above-mentioned resource configuration methods with a same technical effect, which will not be particularly defined herein. The computer-readable storage medium may be, e.g., a read-only memory (Read-Only Memory, ROM), a random access memory (Random Access Memory, RAM), a magnetic disk or an optical disk.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . " it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

The description has been given hereinabove in conjunction with the drawings and the embodiments, but the present disclosure shall not be limited to the above preferred embodiments. These embodiments are for illustrative purposes only, but shall not be used to limit the scope of the present disclosure. A person skilled in the art may make various alternations or modifications without departing from the spirit of the present disclosure and the scope defined in the appended claims, which also fall within the scope of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A resource configuration method applied for a base station, comprising:
transmitting configuration indication information to a terminal, wherein the configuration indication information indicates priority level information about dynamically-scheduled resources and preconfigured grant resources when data transmission is performed by the terminal;
wherein the configuration indication information is transmitted to the terminal through Radio Resource Control (RRC) signaling or physical layer signaling;
in a case that the configuration indication information is transmitted to the terminal through the RRC signaling, which comprises one of the following:
wherein the configuration indication information is transmitted to the terminal through RRC signaling for a configured grant resource,
wherein the configuration indication information is comprised in RRC signaling for configuring a logic channel;
in a case that the configuration indication information is transmitted to the terminal through the physical layer signaling, which comprises one of the following:
wherein the configuration indication information is transmitted to the terminal through a Physical Downlink Control Channel (PDCCH) command for activating preconfigured grant;
wherein the configuration indication information is transmitted to the terminal through a dynamic resource scheduling command, the configuration indication information is indicated through a specific field in DCI carried in the PDCCH command, or indicated through scrambling the PDCCH command with an additionally-configured CS-RNTI,
wherein in a case that a plurality of preconfigured grant resources has been configured by the configured grant resource, the configuration indication information indicates that a priority level of each of a part of the preconfigured grant resources is higher than the priority level of the dynamically-scheduled resource; or,
wherein in a case that the configuration indication information is comprised in RRC signaling for configuring a logic channel, the configuration indication information indicates that a priority level of the transmission of logical channel data through the preconfigured grant resource or one or more specified preconfigured grant resources is higher than a priority level of the transmission of the logical channel data through the dynamically-scheduled resource; or,
wherein in a case that the configuration indication information is transmitted to the terminal through a Physical Downlink Control Channel (PDCCH) command for activating preconfigured grant, the configuration indication information indicates that a priority level of a preconfigured grant resource activated through the PDCCH command is higher than the priority level of the dynamically-scheduled resource; or,
wherein in a case that the configuration indication information is transmitted to the terminal through a dynamic resource scheduling command, the configuration indication information indicates that the priority level of the dynamically-scheduled resource allocated through the dynamic resource scheduling command is higher than or lower than the priority level of the preconfigured grant resource; or,
in a case that the configuration indication information is transmitted to the terminal through RRC signaling for a configured grant resource, the configuration indication information indicates that a priority level of the preconfigured grant resource configured by the configured grant resource is higher than a priority level of the dynamically-scheduled resource.

2. The resource configuration method according to claim 1, wherein in a case that the priority level of each of the part of the preconfigured grant resources is higher than the priority level of the dynamically-scheduled resource, the configuration indication information further indicates priority levels of the plurality of preconfigured grant resources through indicating a correspondence between configured grant resource indices and priority levels, and each preconfigured grant resource index corresponds to a group of preconfigured grant resources.

3. The resource configuration method according to claim 1, wherein in a case that the configuration indication information indicates that the priority level of the transmission of the logical channel data through the one or more specified preconfigured grant resources is higher than the priority level of the transmission of the logical channel data through the dynamically-scheduled resource, the configuration indication information further indicates priority levels of the transmission of logic channel data through the one or more specified preconfigured grant resources.

4. The resource configuration method according to claim 1, wherein the configuration indication information indicates the terminal to select by itself priority levels of the dynamically-scheduled resource and the preconfigured grant resource when the data transmission is performed.

5. The resource configuration method according to claim 1, wherein the configuration indication information indicates the terminal to select by itself priority levels of the dynamically-scheduled resource and the target preconfigured grant resource for the transmission of target logic channel data when the data transmission is performed by the terminal.

6. The resource configuration method according to claim 1, wherein in a case that the configuration indication information indicates that the priority level of the preconfigured grant resource activated through the PDCCH command is higher than the priority level of the dynamically-scheduled resource, the configuration indication information is indicated through a specific field in Downlink Control Information (DCI) carried in the PDCCH command, or indicated through scrambling the PDCCH command with an additionally-configured Configured Scheduling Radio Network Temporary Identifier (CS-RNTI).

7. A resource configuration method applied for a terminal, comprising:
acquiring configuration indication information from a base station, the configuration indication information indicating priority level information about dynamically-scheduled resources and preconfigured grant resources when data transmission is performed by the terminal; and when the dynamically-scheduled resources at least partially overlap the preconfigured grant resources, selecting a resource for the data transmission in accordance with the priority level information;

wherein the configuration indication information is transmitted through Radio Resource Control (RRC) signaling or physical layer signaling;

in a case that the configuration indication information being transmitted through the RRC signaling, which comprises one of the following:

wherein the configuration indication information is transmitted through RRC signaling for a configured grant resource, wherein the configuration indication information is comprised in RRC signaling for configuring a logic channel;

in a case that the configuration indication information being transmitted through the physical layer signaling, which comprises one of the following:

wherein the configuration indication information is transmitted through a Physical Downlink Control Channel (PDCCH) command for activating preconfigured grant;

wherein the configuration indication information is transmitted through a dynamic resource scheduling command, the configuration indication information is indicated through a specific field in DCI carried in the PDCCH command, or indicated through scrambling the PDCCH command with an additionally-configured CS-RNTI, wherein in a case that a plurality of preconfigured grant resources has been configured by the configured grant resource, the configuration indication information indicates that a priority level of each of a part of the preconfigured grant resources is higher than the priority level of the dynamically-scheduled resource; or, wherein in a case that the configuration indication information is comprised in RRC signaling for configuring a logic channel, the configuration indication information indicates that a priority level of the transmission of logical channel data through the preconfigured grant resource or one or more specified preconfigured grant resources is higher than a priority level of the transmission of the logical channel data through the dynamically-scheduled resource; or, wherein in a case that the configuration indication information is transmitted to the terminal through a Physical Downlink Control Channel (PDCCH) command for activating preconfigured grant, the configuration indication information indicates that a priority level of a preconfigured grant resource activated through the PDCCH command is higher than the priority level of the dynamically-scheduled resource; or, wherein in a case that the configuration indication information is transmitted to the terminal through a dynamic resource scheduling command, the configuration indication information indicates that the priority level of the dynamically-scheduled resource allocated through the dynamic resource scheduling command is higher than or lower than the priority level of the preconfigured grant resource; or, in a case that the configuration indication information is transmitted to the terminal through RRC signaling for a configured grant resource, the configuration indication information indicates that a priority level of the preconfigured grant resource configured by the configured grant resource is higher than a priority level of the dynamically-scheduled resource.

8. A terminal, comprising a memory, a processor, and a program stored in the memory and executed by the processor, wherein the processor is configured to execute the program so as to implement the steps of the resource configuration method according to claim 7.

9. A base station, comprising a memory, a processor, and a program stored in the memory and executed by the processor, wherein the processor is configured to execute the program so as to transmit configuration indication information to a terminal, and the configuration indication information indicates priority level information about dynamically-scheduled resources and preconfigured grant resources when data transmission is performed by the terminal;

wherein the configuration indication information is transmitted to the terminal through Radio Resource Control (RRC) signaling or physical layer signaling;

in a case that the configuration indication information being transmitted to the terminal through the RRC signaling, which comprises one of the following:

wherein the configuration indication information is transmitted to the terminal through RRC signaling for a configured grant resource, wherein the configuration indication information is comprised in RRC signaling for configuring a logic channel;

in a case that the configuration indication information being transmitted to the terminal through the physical layer signaling, which comprises one of the following:

wherein the configuration indication information is transmitted to the terminal through a Physical Downlink Control Channel (PDCCH) command for activating preconfigured grant;

wherein the configuration indication information is transmitted to the terminal through a dynamic resource scheduling command, the configuration indication information is indicated through a specific field in DCI carried in the PDCCH command, or indicated through scrambling the PDCCH command with an additionally-configured CS-RNTI, wherein in a case that a plurality of preconfigured grant resources has been configured by the configured grant resource, the configuration indication information indicates that a priority level of each of a part of the preconfigured grant resources is higher than the priority level of the dynamically-scheduled resource; or, wherein in a case that the configuration indication information is comprised in RRC signaling for configuring a logic channel, the configuration indication information indicates that a priority level of the transmission of logical channel data through the preconfigured grant resource or one or more specified preconfigured grant resources is higher than a priority level of the transmission of the logical channel data through the dynamically-scheduled resource; or, wherein in a case that the configuration indication information is transmitted to the terminal through a Physical Downlink Control Channel (PDCCH) command for activating preconfigured grant, the configuration indication information indicates that a priority level of a preconfigured grant resource activated through the PDCCH command is higher than the priority level of the dynamically-scheduled resource; or, wherein in a case that the configuration indication information is transmitted to the terminal through a dynamic resource scheduling command, the configuration indication information indicates that the priority level of the dynamically-scheduled resource allocated through the dynamic resource scheduling command is higher than or lower than the priority level of the preconfigured grant resource; or, in a case that the configuration indication information is transmitted to the terminal through RRC signaling for a configured grant resource, the configuration indication information indicates that a priority level of the preconfigured grant resource configured by the configured grant resource is higher than a priority level of the dynamically-scheduled resource.

\* \* \* \* \*